United States Patent [19]

Killian et al.

[11] Patent Number: 5,395,486
[45] Date of Patent: Mar. 7, 1995

[54] DEHYDRATION PROCESS

[75] Inventors: Michael E. Killian, Lakeland; John C. Stone, Cottage Grove, both of Minn.

[73] Assignee: Minnesota Mining and Manufacturing Company, St. Paul, Minn.

[21] Appl. No.: 139,341

[22] Filed: Oct. 19, 1993

Related U.S. Application Data

[63] Continuation of Ser. No. 816,132, Dec. 31, 1991, abandoned.

[51] Int. Cl.$^6$ ............... B01D 3/34; C07C 303/00
[52] U.S. Cl. .................... 203/14; 203/33; 203/38; 203/98; 260/665 R; 562/30; 562/124; 564/82
[58] Field of Search ............ 203/14, 98, 33, 38, 203/DIG. 21; 260/665 R; 564/82; 562/30, 124; 568/677, 682, 683

[56] References Cited

U.S. PATENT DOCUMENTS

| | | | |
|---|---|---|---|
| 1,416,206 | 5/1922 | Huff | 203/14 |
| 2,500,388 | 3/1950 | Simons | 568/683 |
| 2,519,983 | 8/1950 | Simons | 204/59 R |
| 2,594,272 | 4/1952 | Kauck et al. | 549/428 |
| 2,616,927 | 11/1952 | Kauck et al. | 564/462 |
| 3,214,478 | 10/1965 | Millian | 568/615 |
| 3,242,218 | 3/1966 | Miller | 568/615 |
| 3,250,807 | 5/1966 | Fritz et al. | 562/583 |
| 3,250,808 | 5/1966 | Moore et al. | 562/583 |
| 3,274,239 | 9/1966 | Selman | 562/503 |
| 3,342,875 | 9/1967 | Selman et al. | 568/615 |
| 4,085,518 | 4/1978 | Jackson et al. | 34/17 |
| 4,090,967 | 5/1978 | Falk | 252/2 |
| 4,387,222 | 6/1983 | Koshar | 544/4 |
| 4,582,570 | 4/1986 | Mix | 203/19 |
| 4,788,339 | 11/1988 | Moore et al. | 564/457 |

FOREIGN PATENT DOCUMENTS

| | | |
|---|---|---|
| 61-254216 | 11/1986 | Japan . |
| 2-87473 | 3/1990 | Japan . |
| 3004901 | 1/1991 | Japan ............ 203/14 |
| 0707145 | 4/1954 | United Kingdom ...... 203/14 |

OTHER PUBLICATIONS

*Encyclopedia of Chemical Technology*, Kirk–Othmer, Third Edition, vol. 3, pp. 540–542, John Wiley & Sons (1978).
*Encyclopedia of Chemical Technology*, Kirk–Othmer, Third Edition, vol. 10, pp. 874–881, John Wiley & Sons (1980).
J. T. Dudley et al., *J. Power Sources* 35, 59 (1991).
3M Company's 1990 Bulletin #98–0211–5347–7 (101.5) NPI, "Fluorinert TM Liquids".
DesMarteau et al., *J. Fluor. Chem.* 45, 24 (1989).

*Primary Examiner*—Virginia Manoharan
*Attorney, Agent, or Firm*—Gary L. Griswold; Walter N. Kirn; Lucy C. Weiss

[57] ABSTRACT

Dehydrated compositions are obtained by: combining a hydrous composition, e.g., a hydrous electrolyte salt, with inert fluorochemical liquid; heating the resulting mixture in a vessel to volatilize water and inert fluorochemical liquid therein until the water content of the mixture is reduced to a desired level; optionally treating the resulting dehydrated mixture with another chemical material, e.g., a polar organic solvent; and optionally subjecting the dehydrated mixture or the treated dehydrated mixture to further treatment, e.g., separation of the mixture. Liquid electrolytes suitable for use in battery applications can be prepared by this method.

18 Claims, No Drawings

DEHYDRATION PROCESS

This is a continuation of application Ser. No. 07/816,132, filed Dec. 31, 1991, now abandoned.

This invention relates to a process or method for dehydrating hydrous compositions such as lithium salts, which can then be dissolved in polar organic solvent such as propylene carbonate to form liquid electrolytes for use in battery applications.

Various room temperature or near room temperature battery systems have been investigated with increased interest for a number of years. These are generally non-aqueous systems, as the negative electrode materials typically utilized are highly electrochemically-reducing in nature, precluding the presence of water. Thus, much effort is made to utilize dry components and thereafter to keep such systems dry. Some of these batteries are designed for high-energy density, high power, short-life applications. Others are designed for the very long life and low drain rate characteristics required for implantable medical devices such as cardiac pacemakers, for computer memory backup, and for consumer applications such as cameras. These batteries must be highly reliable. See, for example, *Encyclopedia of Chemical Technology*, Kirk-Othmer, Third Edition, Volume 3, pages 540–42, John Wiley & Sons (1978), and J. T. Dudley et al., *J. Power Sources* 35, 59 (1991).

Such room temperature, non-aqueous battery systems comprise one or more electrochemical cells, each composed of a negative electrode and a positive electrode separated by a solution of an electrolyte salt, typically a solution of the salt in an aprotic solvent such as propylene carbonate. A metal of low atomic weight, i.e., a "light" metal such as lithium, is typically utilized as the reducing agent at the negative electrode. Since such metals are highly electrochemically-reducing materials, their use precludes the use of water or other proton-donating liquids as solvents for the ionizable, light metal electrolyte salts used in said cells. Furthermore, the cells are subject to inferior performance in the form of reduced charge retention, lower discharge voltage, etc., if water or moisture is present even in small amount. Thus, the electrolyte salts utilized must be essentially anhydrous, having a water content preferably no greater than about 50 parts of water per million parts (ppm) of electrolyte salt.

To achieve this requisite dryness, tedious drying procedures have been required. The electrolyte salt materials are sometimes supplied to battery manufacturers in spray-dried form with a water content of about 5000 ppm, and tedious additional drying must then be performed by the manufacturers. This additional drying is typically achieved by rotary vacuum drying, followed by special handling in dry rooms. Generally, solutions of the electrolyte salts in aprotic, polar organic solvents are then prepared in small blend vessels under a dry, inert gas atmosphere. Such procedures are not only tedious, but also costly.

Japanese Patent Application No. 61-254216 (Mitsubishi Yuka Fine Chemicals Co., Ltd.), published Nov. 12, 1986, describes a method of dehydrating inorganic metal salts which comprises dissolving the salts in an oxygen-containing organic solvent having a boiling point greater than or equal to 100° C. and distilling to remove the water to a water content of less than or equal to 10 ppm. The salts are said to be useful as electrolytes in alkaline batteries and in the manufacture of organometallic complexes. However, the examples disclose the use of an additional step of vacuum drying.

Japanese Patent Application No. 2-87473 (Mitsubishi Petrochemical Co., Ltd.), published Mar. 28, 1990, discloses a method of manufacture of organic electrolyte solution. The method comprises combining a solute and a solvent to form an organic electrolyte solution, adding to the electrolyte solution a solvent, such as ethanol or benzene, which forms an azeotrope with water below 100° C., and removing water from the electrolyte solution by azeotropic distillation to give electrolyte solution with water content less than 200 ppm, hopefully less than 10 ppm.

U.S. Pat. No. 5,089,152 (Flynn et al.) describes the use of inert perfluorinated liquids for the displacement drying of wet articles such as electronic components.

U.S. Pat. No. 4,085,518 (Jackson et al.) discloses a process of drying water-wet solid materials comprising forcibly contacting the water-wet solid material with the circulating vapor of a fluorocarbon, thereby producing a mixture of fluorocarbon vapor and water vapor from which a substantial portion of the water vapor is condensed and the remaining vapor mixture heated and recycled.

Briefly, this invention provides an improved process or method of dehydrating (or drying) hydrous compositions comprising, consisting, or consisting essentially of water and another chemical substance or mixture of chemical substances other than water. (As used herein, the term "hydrous" means having a water content generally greater than about 100 ppm.) The hydrous compositions which can be dehydrated by the method of this invention include hydrates, damp solids, aqueous slurries, aqueous solutions, water-contaminated polar organic solvent solutions, and water-contaminated, high-boiling, polar organic solvents.

The improved dehydration process of the invention comprises the following steps: (a) combining, such as by mixing, the hydrous composition with inert fluorochemical liquid to form a liquid mixture thereof; and (b) heating the resulting liquid combination or mixture in a vessel to volatilize water and inert fluorochemical liquid therein until the water content of the remaining mixture is reduced to a desired level, e.g., a level which is acceptable for the intended use of the mixture or chemical substance(s) therein. The resulting dehydrated mixture can optionally be treated with another chemical material such as polar organic solvent capable of dissolving or forming a solution of the dehydrated chemical substance(s). The dehydrated mixture or treated dehydrated mixture can also optionally be subjected to further treatment or manipulation, e.g., separation of the dehydrated chemical substance(s) from the remaining inert fluorochemical liquid and/or any impurities. The volatilization of water and inert fluorochemical liquid is preferably carried out by distillation, and the distillate resulting from the distillation is preferably collected and allowed to phase separate into an upper water phase and a lower fluorochemical phase, e.g., by use of a decanter, so that the lower fluorochemical phase of the distillate can be directly and continuously recycled or returned to the distillation vessel.

The dehydration process of the invention is especially useful for dehydrating hydrous, ionizable, light metal salts useful as battery electrolytes. The method is simple and cost-effective and enables elimination of the tedious electrolyte drying procedures typically used in the battery industry. For use in battery applications, the water content of the dehydrated electrolyte salt is preferably reduced to less than about 50 ppm. If non-aqueous liquid battery electrolytes, i.e., solutions of electrolyte salt in organic solvent, are desired, the dehydrated salt or dehydrated salt-fluorochemical liquid mixture can be treated with aprotic, polar organic solvent to form a solvent solution of the salt. This solvent solution phase-separates from the inert fluorochemical liquid and, if desired, can be easily separated therefrom, e.g., by draining off the lower inert fluorochemical liquid phase. The aprotic, polar organic solvents utilized in preparing liquid battery electrolytes are generally dry, i.e., generally have a water content low enough that the water content of the liquid electrolyte is less than about 100 ppm, preferably less than about 50 ppm. This method of preparing electrolyte solutions enables both the preliminary dehydration steps and the solution preparation steps necessary in battery manufacture to be carried out easily and efficiently while maintaining a dry atmosphere, and a completely formulated liquid battery electrolyte product can be directly obtained.

Alternatively, the dehydrated composition or dehydrated composition-fluorochemical liquid mixture can be treated with a chemical material (other than an organic solvent) for the purpose of chemically converting the dehydrated composition to a different composition. For example, a dehydrated salt, such as lithium perfluoromethane sulfonate, can be treated with an acid, such as 100 percent sulfuric acid, to convert the salt to the corresponding anhydrous acid, e.g., perfluoromethane sulfonic acid. Additional treatment steps, such as the separation of by-products or impurities by filtration or decantation, can then be carried out.

A feature of the process of this invention is the use of inert fluorochemical liquid, which prevents the caking of the chemical substance, e.g., the electrolyte salt, during the dehydration process and also enables the direct transfer of the dehydrated composition from the non-polar fluorochemical phase to a polar organic solvent or other chemical treatment phase, with easy separation of the inert fluorochemical liquid. The process of the invention can be carried out, if desired, in a single vessel or kettle.

Hydrous compositions which can be dehydrated by the process of the invention are those which comprise, consist, or consist essentially of water and another chemical substance or mixture of chemical substances other than water. Such compositions generally contain amounts of water greater than about 100 ppm, which can be in the form of either free water or water of hydration. Chemical substances which can be contained in the hydrous compositions are those which are substantially insoluble in inert fluorochemical liquid and which are thermally stable at the volatilization temperatures utilized. These chemical substances can be liquids (such as polar organic solvents, e.g., propylene carbonate), or solids (such as alkali metal hydroxides, e.g., lithium hydroxide monohydrate, and alkali metal halides, e.g., potassium fluoride and cesium fluoride), or mixtures of either or both. Other materials such as conductivity additives and stabilizers can be present in the hydrous compositions. When essentially only impurities are present in addition to the chemical substance and water, e.g., impurities resulting from the particular chemical preparation method or mineral impurities present in the particular source of the water, the compositions will consist essentially of chemical substance and water.

The process of the invention is especially useful for dehydrating hydrous, ionizable, light metal salts used as battery electrolyte solutes. Such salts include alkali metal, alkaline earth metal, and Group IIIB metal, e.g., aluminum, salts of anions such as $BF_4^-$; $PF_6^-$; $AsF_6^-$; $ClO_4^-$; $SbF_6^-$; $R_fSO_3^-$, where $R_f$ is a perfluoroalkyl group of one to about 12 carbon atoms, preferably one to about four carbon atoms; the bis-sulfonimide anion, $(R_f-SO_2-N-SO_2-R'_f)^-$, where $R_f$ and $R'_f$ are independently selected from perfluoroalkyl groups of one to about 12 carbon atoms, preferably one to about four carbon atoms; and the bis-sulfonyl methane anion, $(R_f-SO_2-C(R)-SO_2-R'_f)^-$, where $R_f$ and $R'_f$ are independently selected from perfluorinated alkyl groups of one to about 12 carbon atoms, preferably one to about four carbon atoms, and R is H, Br, Cl, I, alkyl of one to about 20 carbon atoms, alkenyl of three to four carbon atoms, aryl, or alkaryl. Such salts also include cyclic perfluoroaliphaticdisulfonimide salts, such as those described in U.S. Pat. No. 4,387,222 (Koshar), and metal salts of acids, such as those described by DesMarteau et al. in *J. Fluor. Chem.* 45, 24 (1989).

Representative examples of chemical substances that can be contained in the hydrous compositions which can be dehydrated by the process of this invention include the polar organic solvents exemplified hereinbelow, compounds such as $LiOH \cdot H_2O$, $LiBF_4$, $LiPF_6$, $LiAsF_6$, $LiClO_4$, $CF_3SO_3Li$, $C_2F_5SO_3Li$, $C_{10}F_{21}SO_3Li$, $(CF_3SO_3)_2Ba$, $(CF_3SO_2)_2NLi$, $(CF_3SO_2)_2NNa$, $[(CF_3SO_2)_2N]_3Al$, $(CF_3SO_2)_2C(H)Li$, cyclo-$(CF_2SO_2)_2NLi$, cyclo-$(CF_2SO_2)_2C(H)Li$, and mixtures thereof.

Fluorochemical liquids suitable for use in the process of the invention are stable, inert (i.e., chemically non-reactive), non-polar, highly fluorinated, preferably perfluorinated, liquids which can be single compounds but usually will be a mixture of compounds having such nature. The fluorochemical liquids have molecular structures which can be straight-chained, branched-chained, or cyclic, or a combination thereof, such as alkylcycloaliphatic, and are preferably free of ethylenic unsaturation. The skeletal chain of the molecular structure can include catenary oxygen, hexavalent sulfur, and/or trivalent nitrogen heteroatoms bonded only to carbon atoms, such heteroatoms providing stable linkages between fluorocarbon groups and not interfering with the inert character of the liquid. The inert fluorochemical liquid generally will preferably have about 6 to about 20 carbon atoms, the maximum number of carbon atoms being dictated by the desired boiling point. Generally, preferred inert fluorochemical liquids will have a boiling point in the range from about 50° C. to about 275° C., preferably from about 65° C. to about 200° C., most preferably from about 80° C. to about 110° C. Such liquids are capable of volatilization along with water, yet have neither so high a boiling point as to require large heat input to effect volatilization nor so low a boiling point that losses occur. Generally, the fluorochemical liquid will preferably contain about 60 to 76 weight percent carbon-bonded fluorine. The fluorochemical liquid can contain some hydrogen or chlorine, e.g., less than one atom of either hydrogen or chlorine for every two carbon atoms, but is preferably substantially completely fluorinated.

Inert fluorochemical liquids useful in the process of this invention are known and readily available, usually as mixtures. U.S. Pat. No. 3,250,807 (Fritz et al.), U.S. Pat. No. 3,250,808 (Moore et al.), and U.S. Pat. No.

3,274,239 (Selman) disclose fluorinated oils, made by polymerization of perfluoropropylene oxide, which can be stabilized, e.g., as disclosed in U.S. Pat. No. 3,214,478 (Millian), U.S. Pat. No. 3,242,218 (Miller), and U.S. Pat. No. 3,342,875 (Selman et al.), to provide inert fluorochemical liquids useful in this invention, said stabilization converting functional or active end groups to inert carbon-bonded hydrogen or fluorine by reaction with fluorinating agents, protic bases, or ultraviolet radiation. U.S. Pat. No. 2,500,388 (Simons), U.S. Pat. No. 2,519,983 (Simons), U.S. Pat. No. 2,594,272 (Kauck et al.), U.S. Pat. No. 2,616,927 (Kauck et al.), and U.S. Pat. No. 4,788,339 (Moore et al.) describe the preparation of inert, highly fluorinated compounds, such as highly fluorinated hydrocarbons, ethers, aminoethers, and tertiary amines, said preparation involving electrochemical fluorination in anhydrous HF medium. Commercially available inert fluorochemical liquids useful in this invention include 3M's Fluorinert TM liquids, e.g., FC-40, FC-43, FC-70, FC-71, FC-72, FC-75, FC-77, and FC-84, described in the 3M Company's 1990 bulletin #98-0211-5347-7(101.5) NPI, "Fluorinert TM Liquids," and mixtures thereof Also useful individually or as mixtures are Krytox TM K fluids, Flutec TM PP fluids, and Galden TM LS fluids.

Inert fluorochemical liquids useful in this invention also include those described in *Encyclopedia of Chemical Technology*, Kirk-Othmer, Third Edition, Volume 10, pages 874–81, John Wiley & Sons (1980). Useful liquids include perfluoro-4-methylmorpholine, perfluorotriethylamine, perfluoro-2-ethyltetrahydrofuran, perfluoro-2-butyltetrahydrofuran, perfluorohexane, perfluoro-4-isopropylmorpholine, perfluorodibutyl ether, perfluoroheptane, perfluorooctane, perfluorotripropylamine, perfluorononane, perfluorotributylamine, perfluorotriamylamine, perfluorotrihexylamine, perfluorodihexyl ether, perfluoro[2-(diethylamino)ethyl-2-(N-morpholino) ethyl]ether, perfluorotetrahydrophenanthrene, and mixtures thereof. Preferred inert fluorochemical liquids include perfluorotributylamine, perfluorotriamylamine, perfluorohexane, perfluoro-2-butyltetrahydrofuran, perfluoroheptane, perfluorooctane, and mixtures thereof, especially perfluoroheptane and perfluorooctane. Such liquids are preferred because their boiling points are within the preferred ranges described supra.

According to the process of this invention, the hydrous composition can be combined or mixed with at least enough inert fluorochemical liquid to provide a mobile slurry of the composition. Generally the inert fluorochemical liquid will preferably constitute from about 30 to about 90 weight percent of the mixture, most preferably from about 50 to about 80 weight percent. The hydrous composition and inert fluorochemical liquid can be combined in a kettle or other vessel adapted to facilitate the dehydration, such as one fitted with a condenser which is arranged so that condensate is generally directed to a receiver or, preferably, a decanter. The kettle or vessel can also be fitted with a heating jacket, internal heating coils, or other heating means to bring about volatilization of water and inert fluorochemical liquid. The kettle or vessel is preferably equipped with a stirrer to enable agitation of the contents of the kettle or vessel to ensure uniform mixing thereof, and is also preferably equipped with an inert gas inlet and, optionally, outlet to enable the blanketing of the contents of the kettle or vessel with a dry, inert gas to help ensure dry conditions. The mixture of hydrous composition and inert fluorochemical liquid is heated to a temperature sufficient to initiate volatilization or, preferably, distillation (at atmospheric pressure, under vacuum, or under greater than atmospheric pressure) of water and inert fluorochemical liquid. This temperature will vary depending upon the particular inert fluorochemical liquid utilized, but generally the temperature will be at least about 80° C. at atmospheric pressure, and preferably will be at or above the boiling point of water. When distillation is carried out, the resulting distillate is preferably collected in the receiver or decanter and allowed to phase separate. A decanter is preferably utilized so that the fluorochemical phase of the phase-separated distillate can be directly and continuously recycled or returned to the kettle or vessel containing the combination or mixture of the hydrous composition and inert fluorochemical liquid. This recycled phase may initially contain some water, at least until good phase separation is achieved. If a receiver, rather than a decanter, is utilized, direct recycle of the inert fluorochemical liquid is not feasible, and separate replenishment in the form of either fresh or recovered inert fluorochemical liquid can then be utilized if replenishment is needed. Volatilization can be continued until the water content, as determined by standard analytical methods such as Karl Fischer titration, of the composition-fluorochemical liquid combination or mixture is reduced to a level which is acceptable for the intended use of the mixture or chemical substance(s) therein. For battery applications, the water content of the combination or mixture can be generally less than about 100 ppm, preferably less than about 50 ppm. When an acceptable water content is reached, the dry slurry of the dehydrated composition and inert fluorochemical liquid is preferably cooled to ambient temperature under a dry, inert gas atmosphere, preferably argon. If desired, the dehydrated composition and inert fluorochemical liquid can then be separated, for example, by using solids separation equipment such as a filter, under dry conditions to provide the isolated, dehydrated composition, which comprises the dry chemical substance(s) and any other components not removed in the volatilization step, such as additives or impurities which may require further treatment for removal.

If a solution of dehydrated composition in polar organic solvent is desired, the isolated, dehydrated composition or the cooled, dehydrated composition-fluorochemical liquid mixture is treated with polar organic solvent and then preferably agitated to facilitate the dissolution of the dehydrated composition in the polar organic solvent. If the cooled, dehydrated composition-fluorochemical liquid mixture is utilized, the inert fluorochemical liquid can then be allowed to phase-separate from the solution of dehydrated composition in organic solvent and, if desired, can be separated from the solution, e.g., by draining off the fluorochemical liquid, to provide a solution of dehydrated composition in polar organic solvent.

Water-contaminated liquid battery electrolytes or other water-containing or water-contaminated solutions of compositions of interest in polar organic solvents can be dehydrated by the process of the invention by first adding inert fluorochemical liquid to the water-contaminated electrolyte solution or other solution and then volatilizing by preferably distilling and collecting the inert liquid, the water, and (when the boiling points of the organic solvent and the inert liquid are comparable) the organic solvent, preferably with recycle or separate replenishment of the distilled inert fluorochemical liquid (as needed), in the manner described above. Recovery of dehydrated composition or dehydrated solution of composition of interest, depending upon the boiling point of the polar organic solvent or solvents, can be accomplished by this method. At the conclusion of the dehydration steps, a solvent or a blend of solvents can be added to the dehydrated composition or dehydrated solution of the composition of interest, if desired, (or, alternatively, solvent can be removed by distillation) to provide a solution of dehydrated composition of the appropriate composition and concentration for the intended use. For battery applications, an aprotic, polar organic solvent which is generally dry (or a blend of such solvents) is utilized. High-boiling, polar organic solvents, e.g., ethylene glycol and propylene carbonate, can also be dehydrated by the process of the invention.

Polar organic solvents useful in the process of this invention are those which are capable of at least partially dissolving the dehydrated composition. For example, polar organic solvents such as ethylene glycol, methanol, ethanol, 2-ethoxy ethanol, and 2-(2-ethoxy ethoxy) ethanol can be used. If preparation of a non-aqueous liquid battery electrolyte is desired, an aprotic, polar organic solvent is utilized, and such solvent is generally dry, i.e., generally has a water content low enough that the water content of the liquid electrolyte is less than about 100 ppm, preferably less than about 50 ppm. Suitable aprotic, polar organic solvents include linear ethers such as diethyl ether and 1,2-dimethoxyethane; cyclic ethers such as tetrahydrofuran, 2-methyltetrahydrofuran, dioxane, dioxolane, and 4-methyldioxolane; esters such as methyl formate, ethyl formate, methyl acetate, diethyl carbonate, propylene carbonate, ethylene carbonate, and butyrolactones; nitriles such as acetonitrile and benzonitrile; nitro compounds such as nitromethane or nitrobenzene; amides such as N,N-dimethylformamide, N,N-diethylformamide, and N-methylpyrrolidone; sulfoxides such as dimethyl sulfoxide; sulfones such as dimethylsulfone, tetramethylene sulfone, and other sulfolanes; oxazolidones such as N-methyl-2-oxazolidone; and mixtures thereof. For battery applications, the solvent is chosen to provide the particular conductance, viscosity, and metal reactivity properties desired for a liquid electrolyte. Mixtures of solvents can be employed and are sometimes preferred in tailoring the solvent system's properties to provide optimum performance. Solvent is added to a dehydrated composition in an amount such that an electrolyte solution of the desired concentration is obtained, e.g., in the range of about 0.75M to about 2.5M.

This invention is further illustrated by the following examples, but the particular materials and amounts thereof recited in these examples, as well as other conditions and details, should not be construed to unduly limit this invention. All parts are by weight unless otherwise stated. All determinations of water content in the examples were performed by Karl Fischer titration using a 652 KF Coulometer instrument made by Metrohm in Switzerland and distributed by Brinkmann Instruments in the U.S.A. The inert fluorochemical liquids utilized in the examples are listed in Table I below.

TABLE I

| Inert Fluoro-chemical Liquid | Major Component | Approximate Boiling Point (°C.) |
|---|---|---|
| FL-1 | $C_7F_{16}$ | 85 |

TABLE I-continued

| Inert Fluoro-chemical Liquid | Major Component | Approximate Boiling Point (°C.) |
|---|---|---|
| FL-2 | $C_8F_{18}$ | 100 |
| FL-3 | $(C_4F_9)_3N$ | 170 |

EXAMPLES

Example 1

This example demonstrates the dehydration of an aqueous solution of lithium perfluoromethane sulfonate (with direct and continuous return or recycle of the distilled inert fluorochemical liquid FL-2) and the preparation of a solution of the dehydrated composition in 1,2-dimethoxyethane.

In a glass distillation flask fitted with a condenser was placed 175 parts of a 70 weight percent aqueous solution of lithium perfluoromethane sulfonate, $CF_3SO_3Li$ (obtained from the alkaline hydrolysis of trifluoromethanesulfonyl fluoride, $CF_3SO_2F$, with aqueous lithium hydroxide solution). The solution was heated to 100°–105° C. and water distilled off (31 parts) until the contents of the flask changed from a clear solution to a thick slurry. To this slurry was added 350 parts of inert fluorochemical liquid FL-2 (see Table 1 above) in preparation for removal of the remaining water. The mixture was refluxed at about 100° C., and the distillate, consisting of an upper water phase and a lower fluorochemical liquid phase, was collected in a glass decanter adapted for continuous return of the bottom inert fluorochemical liquid phase to the distillation flask. During about 3 hours, an additional 21.5 parts of distilled water was collected. Analysis of a sample of the solid in the fluorochemical liquid slurry showed the solid contained 35 ppm water.

The slurry was cooled under dry nitrogen to 20° C., then 390 parts of 1,2-dimethoxyethane were added gradually to the slurry over about 15 minutes to dissolve the $CF_3SO_3Li$ salt. The temperature of the mixture was maintained below 25° C. during the slightly exothermic dissolving process. The resulting two-phase mixture was transferred to a dry separatory funnel and the phases allowed to separate. A good phase split was obtained, yielding 349 parts of a bottom fluorochemical liquid phase and 506 parts of a top salt solution phase as a clear, colorless liquid. The percent $CF_3SO_3Li$ solids in the 1,2-dimethoxyethane solution was 23.9 weight percent, a 98.7 percent recovery of the salt.

Example 2

This example demonstrates the dehydration of damp lithium perfluoromethane sulfonate (with direct and continuous return or recycle of the distilled inert fluorochemical liquid FL-2) and the preparation of a solution of the dehydrated composition in propylene carbonate.

In a glass distillation flask fitted with a condenser, 25 parts of lithium perfluoromethane sulfonate (prepared as in Example 1 and containing 4500 ppm water) and 100 parts of inert fluorochemical liquid FL-2 were combined. The resulting slurry was heated to reflux (99° C.), and the condensate was collected in a decanter adapted for continuous return of the bottom fluorochemical liquid phase to the distillation flask while collecting the top water phase. After about three hours, the contents of the distillation flask was cooled to 25° C. under dry argon. Analysis of the solid in the fluorocarbon liquid slurry showed the solid contained 19 ppm water. Propylene carbonate (80 parts) containing 12 ppm water was added to the distillation flask. The resulting multi-phase mixture was stirred at 25° C. under a dry argon atmosphere to dissolve the solid, then agitation was stopped and the resulting two phases allowed to separate. The bottom fluorochemical liquid phase was drained off before collecting 98 parts of clear liquid product solution. The solution contained 23.5 weight percent salt and had a water content of 70 ppm.

Example 3

This example demonstrates the dehydration of an aqueous solution of lithium perfluoromethane sulfonate (with direct and continuous return or recycle of the distilled inert fluorochemical liquid FL-2) and the preparation of a solution of the dehydrated composition in polar organic solvent comprising a mixture of ethers.

To a stainless steel distillation vessel fitted with a condenser was added 30 parts of a 70 weight percent aqueous solution of lithium perfluoromethane sulfonate (prepared as in Example 1) and 115 parts of inert fluorochemical liquid FL-2. The mixture was heated to reflux (98° C.), and the condensate was collected in a decanter adapted to return the bottom fluorochemical liquid phase to the distillation vessel and to periodically take off the top water phase collecting in the decanter. These conditions were maintained for about 12 hours, after which the mixture in the distillation vessel was cooled under dry argon and the solid in the resulting slurry sampled for water analysis. The water content of the solid was found to be 250 ppm, so reflux was continued until the solid was found by analysis to contain 8 ppm water. Under dry argon and keeping the temperature below 25° C. 80 parts of an aprotic, polar organic solvent, comprising a mixture of ethers and containing 33 ppm water, was added to the slurry in the distillation vessel. The resulting mixture was stirred for 30 minutes to dissolve the solid, then allowed to phase separate. After draining off the bottom fluorochemical liquid phase, 75 parts of clear liquid product solution was drained to containers purged with dry argon. The solution contained 21.8 weight percent salt and 68 ppm water.

Example 4

This example demonstrates the dehydration of damp lithium perfluorodecane sulfonate (with direct and continuous return or recycle of the distilled inert fluorochemical liquid FL-2).

To a glass distillation flask fitted with a condenser were added 200 parts of wet (8000 ppm water) lithium perfluorodecane sulfonate (obtained from the alkaline hydrolysis of $C_{10}F_{21}SO_2F$ with lithium hydroxide) and 466 parts of inert fluorochemical liquid FL-2. The resulting slurry was heated to reflux (99° C.) and held for three hours, while collecting the condensate in a decanter adapted to continuously return the bottom fluorochemical liquid phase to the distillation flask and to accumulate the water phase in the decanter. A total of 1.6 parts of water was collected. The slurry was cooled under dry nitrogen. A sample of the solid in the slurry was analyzed, and the water content was found to be 302 ppm.

Example 5

This example demonstrates the dehydration of an aqueous solution of lithium perfluoromethane sulfonate (with separate replenishment (fresh makeup) rather than recycle of inert fluorochemical liquid FL-2) and the preparation of a solution of the dehydrated composition in 1,3-dioxolane.

To a glass distillation flask was added 28 parts of a 70% weight percent aqueous solution of lithium perfluoromethane sulfonate (prepared as in Example 1), and the solution was heated to 100°-105° C. for one hour to boil off about 60% of the water. The salt solution was cooled and 114 parts of inert fluorochemical liquid FL-2 added. The resulting slurry was heated to reflux (98°-99° C.) to remove water-fluorochemical liquid vapor. Additional amounts of fluorochemical liquid were added in 100-part increments to maintain the liquid level in the distillation flask as the dehydration proceeded. Reflux and addition were continued until the solid in the slurry was found by analysis to contain 10 ppm water. The slurry was cooled under dry argon, and 65 parts of 1,3-dioxolane (containing 43 ppm water) was added gradually to the slurry while keeping the temperature below 25° C. with cooling. After stirring to dissolve the solid, the mixture was allowed to phase separate. The bottom fluorochemical liquid phase was removed, and then 66 parts of clear liquid product solution was drained to argon-purged containers. The solution contained 20.6 weight percent salt and had a water content of 28 ppm.

Example 6

This example demonstrates the dehydration of an aqueous solution of lithium perfluoromethane sulfonate (with direct and continuous return or recycle of the distilled inert fluorochemical liquid FL-3) and the preparation of a solution of the dehydrated composition in 1,2-dimethoxyethane.

To a glass distillation flask fitted with a condenser was added 100 g of a 70 weight percent aqueous lithium perfluoromethane sulfonate solution and 180 mL of inert fluorochemical liquid FL-3. The resulting slurry was heated to reflux and the condensate collected in a decanter adapted to continuously return the bottom fluorochemical phase of the condensate to the distillation flask and to periodically take off the top water phase of the condensate collecting in the decanter. After 2 hours, 30 g of water had been removed from the decanter. The final reflux temperature was 170° C. The resulting white slurry was cooled under nitrogen to 25° C., and 195 g of 1,2-dimethoxyethane was added to the slurry. The latter slurry was agitated and the phases allowed to separate to yield an upper phase of a 26.5 weight percent solution of dehydrated $CF_3SO_3Li$ in 1,2-dimethoxyethane and a lower phase of FL-3 liquid.

Example 7

This example demonstrates the dehydration of an aqueous solution of lithium perfluoromethane sulfonate (with direct and continuous return or recycle of the distilled inert fluorochemical liquid FL-1).

To a glass distillation flask fitted with a condenser was added 70 g of a 70 weight percent aqueous lithium perfluoromethane sulfonate solution and 100 mL of inert fluorochemical liquid FL-1. The resulting mixture was heated to reflux (83° C.) and the condensate collected in a decanter adapted to continuously collect the water phase of the condensate and to recycle the inert fluorochemical liquid phase as described in Example 6. After 7 hours, 21 g of water had been collected in the decanter. The resulting white slurry in the distillation flask was cooled under nitrogen to 25° C. and poured into a nitrogen-purged Buchner filter to collect the dehydrated $CF_3SO_3Li$ product, a fine, free-flowing white powder.

Example 8

This example demonstrates the dehydration of damp lithium perfluorodecane sulfonate (with direct and continuous return or recycle of the distilled inert fluorochemical liquid FL-2) and the preparation of a solution of the dehydrated composition in ethylene glycol.

In a glass distillation flask fitted with a condenser was placed 50 g lithium perfluorodecane sulfonate, $C_{10}F_{21}SO_3Li$, containing 8000 ppm of water, and 100 mL of inert fluorochemical liquid FL-2. The slurry was heated to reflux (100° C.) and the condensate collected in a decanter adapted to continuously collect the water phase of the condensate and to recycle the inert fluorochemical liquid phase as described above. After 2 hours, a small amount of water (<1 mL) had collected. The white slurry in the distillation flask was cooled under nitrogen to 25° C. and 92 g of ethylene glycol added to dissolve the dehydrated $C_{10}F_{21}SO_3Li$ product. The resulting mixture was agitated and the phases allowed to separate to yield 140 g of a clear, amber 34.7 weight percent solution of the dehydrated lithium salt in ethylene glycol.

This example demonstrates the dehydration of an aqueous slurry of barium perfluoromethane sulfonate (with direct and continuous return or recycle of the distilled inert fluorochemical liquid FL-2).

To a 250 mL 3-necked flask, equipped with a decanter and Friedrich condenser and containing 7.0 g of barium perfluoromethane sulfonate, $(CF_3SO_3)_2Ba$, and 20 mL of water, was added 20 mL of inert fluorochemical liquid FL-2. The mixture was refluxed for 3 hours while recycling the distilled FL-2 liquid and collecting the distilled water (20 mL). A slurry of the dehydrated barium salt and the inert fluorochemical liquid remained in the flask.

This example demonstrates the dehydration of an aqueous solution of lithium bis(perfluoromethane sulfonyl) imide (with direct and continuous return or recycle of the distilled inert fluorochemical liquid FL-2) and the preparation of a solution of the dehydrated composition in propylene carbonate.

To a 250 mL 3-necked flask, equipped with a decanter and Friedrich condenser and containing 28.7 g of lithium bis(perfluoromethane sulfonyl) imide, $(CF_3SO_2)_2NLi$, and 30 mL of water, was added 30 mL of inert fluorochemical liquid FL-2. The mixture was refluxed for 3 hours while recycling the distilled FL-2 liquid and collecting the distilled water (30 mL). To the slurry of dehydrated lithium salt and inert fluorochemical liquid in the flask was added 29 g of propylene carbonate solvent. Agitation of the resulting mixture and allowing the two liquid phases thereof to separate gave a clear upper phase of a 50 weight percent solution of the lithium sulfonimide salt in propylene carbonate solvent and a lower phase of FL-2 liquid.

Example 11

This example demonstrates the dehydration of an aqueous solution of sodium bis(perfluoromethane sulfonyl) imide (with direct and continuous return or recycle of the distilled inert fluorochemical liquid FL-2).

To a 250 mL 3-necked flask, equipped with a decanter and Friedrich condenser and containing sodium bis(perfluoromethane sulfonyl) imide, $(CF_3SO_2)_2NNa$ (prepared in situ from 22 g (0.10 mole) of sulfonimide, $(CF_3SO_2)_2NH$, and 5.3 g (0.05 mole) of sodium carbonate in 20 mL of water), was added 20 mL of inert fluorochemical liquid FL-2. The resulting mixture was refluxed for 4 hours while recycling the distilled FL-2 liquid and collecting the distilled water (20 mL). A slurry of the dehydrated sodium sulfonimide salt and the inert fluorochemical liquid remained in the flask.

Example 12

This example demonstrates the dehydration of a hydrate, specifically lithium hydroxide monohydrate, (with direct and continuous return or recycle of the distilled inert fluorochemical liquid FL-2).

To a 250 mL 3-necked flask, equipped with a decanter and Friedrich condenser and containing 4.2 g (0.10 mole) of lithium hydroxide monohydrate, $LiOH \cdot H_2O$, was added 30 mL of inert fluorochemical liquid FL-2. The resulting mixture was refluxed for about 3 hours while recycling the distilled FL-2 liquid and collecting the distilled water (about 1.8 mL, 0.10 mole). A slurry of the dehydrated lithium hydroxide and inert fluorochemical liquid remained in the flask.

Example 13

This example demonstrates the dehydration of a water-contaminated solution of lithium perfluoromethane sulfonate in propylene carbonate (with direct and continuous return or recycle of the distilled inert fluorochemical liquid FL-2).

To a 250 mL 3-necked flask equipped with a decanter and a Fredrich condenser, was added 150 mL of inert fluorochemical liquid FL-2 and 50 g of a 25 weight percent solution of lithium perfluoromethane sulfonate in propylene carbonate (12.5 g of $CF_3SO_3Li$ in 37.5 g of propylene carbonate) containing 410 ppm water. The resulting mixture was heated to reflux and the condensate collected in the decanter adapted to continuously return the bottom fluorochemical liquid phase of the condensate to the distillation vessel and to periodically take off the top water-propylene carbonate phase of the condensate collecting in the decanter. After 3 hours, approximately 1 mL of water-propylene carbonate top phase had been removed. The final reflux temperature was 101° C. The heat source was removed and a sample of the hot, upper organic solution phase of the mixture in the flask was removed and analyzed immediately for water content. The average value obtained from three successive analyses of the hot organic solution was about 14 ppm water (average of 13.5, 14.2, and 13.9 ppm), indicating the removal of about 396 ppm of water.

Various modifications and alterations of this invention will become apparent to those skilled in the art without departing from the scope and spirit of this invention.

We claim:

1. A method of dehydrating a hydrous composition comprising the following steps:

(a) combining the hydrous composition with inert perfluorinated liquid to form a liquid mixture thereof, said inert perfluorinated liquid having from about 6 to about 20 carbon atoms and being selected from the group consisting of perfluorinated hydrocarbons, perfluorinated ethers, perfluorinated aminoethers, perfluorinated tertiary amines, and mixtures thereof, and said hydrous composition comprising water and a chemical substance which is substantially insoluble in aid inert perfluorinated liquid; and (b) heating said mixture in a vessel to volatilize water and said inert perfluorinated liquid therein until the water content of said mixture is reduced to a desired level.

2. The method of claim 1 wherein said chemical substance is selected from the group consisting of salts, polar organic solvents, and mixtures thereof.

3. The method of claim 1 wherein said chemical substance is a solution of salt in polar organic solvent.

4. The method of claim 1 wherein said water content is reduced to less than about 100 parts per million.

5. The method of claim 1 wherein said volatilization is carried out by distillation.

6. The method of claim 5 further comprising the step of collecting the resulting distillate and directly and continuously returning a fluorochemical phase of said distillate to said vessel.

7. The method of claim 1 wherein said inert perfluorinated liquid has a boiling point in the range of from about 50° C. to about 275° C.

8. The method of claim 1 wherein the resulting dehydrated mixture is treated with polar organic solvent.

9. The method of claim 8 wherein said polar organic solvent is aprotic.

10. The method of claim 9 wherein said aprotic, polar organic solvent comprises propylene carbonate.

11. The method of claim 8 wherein said dehydrated mixture is cooled prior to said treatment with polar organic solvent.

12. The method of claim 8 wherein the resulting treated dehydrated mixture is subjected to further treatment comprising separation of said inert perfluorinated liquid from said treated dehydrated mixture.

13. The method of claim 1 wherein the resulting dehydrated mixture is subjected to treatment comprising separation of said inert perfluorinated liquid from said dehydrated mixture.

14. A method of dehydrating a hydrous composition comprising the following steps:
(a) combining the hydrous composition with inert fluorochemical liquid to form a liquid mixture thereof, said inert fluorochemical liquid having from about 6 to about 20 carbon atoms and said hydrous composition comprising water and a chemical substance which is substantially insoluble in said inert fluorochemical liquid and which is selected from the group consisting of lithium perfluoromethane sulfonate, lithium perfluorodecane sulfonate, barium perfluoromethane sulfonate, lithium bis(perfluoromethane sulfonyl) imide, sodium bis(perfluoromethane sulfonyl) imide, and lithium hydroxide monohydrate; and
(b) heating said mixture in a vessel to volatilize water and said inert fluorochemical liquid therein until the water content of said mixture is reduced to a desired level.

15. The method of claim 14 wherein said chemical substance is lithium perfluoromethane sulfonate or lithium bis(perfluoromethane sulfonyl)imide.

16. A method of dehydrating a hydrous composition comprising the following steps:
(a) combining the hydrous composition with inert fluorochemical liquid to form a liquid mixture thereof, said inert fluorochemical liquid having from about 6 to about 20 carbon atoms and said hydrous composition comprising water and a chemical substance which is substantially insoluble in said inert fluorochemical liquid and which is a solution of lithium perfluoromethane sulfonate or lithium bis(perfluoromethane sulfonyl) imide in polar organic solvent comprising propylene carbonate; and
(b) heating said mixture in a vessel to volatilize water and said inert fluorochemical liquid therein until the water content of said mixture is reduced to a desired level.

17. A method of dehydrating hydrous lithium perfluoromethane sulfonate or hydrous lithium bis(perfluoromethane sulfonyl) imide comprising the following steps:
(a) combining hydrous lithium perfluoromethane sulfonate or hydrous lithium bis(perfluoromethane sulfonyl) imide with inert fluorochemical liquid comprising perfluorooctane to form a liquid mixture thereof;
(b) heating said mixture in a vessel to volatilize water and said inert fluorochemical liquid therein until the water content of said mixture is reduced to a desired level;
(c) treating the resulting dehydrated mixture with polar organic solvent comprising propylene carbonate; and
(d) separating the resulting solvent solution of lithium perfluoromethane sulfonate or lithium bis(perfluoromethane sulfonyl) imide from said inert fluorochemical liquid.

18. A method of dehydrating a hydrous composition comprising the following steps:
(a) combining the hydrous composition with inert fluorochemical liquid to form a liquid mixture thereof, said inert fluorochemical liquid being selected from the group consisting of perfluorotributylamine, perfluorotriamylamine, perfluoro-2-butyltetrahydrofuran, perfluorohexane, perfluoroheptane, perfluorooctane, and mixtures thereof; and
(b) heating said liquid mixture in a vessel to volatilize water and said inert fluorochemical liquid therein until the water content of said mixture is reduced to a desired level.

* * * * *

UNITED STATES PATENT AND TRADEMARK OFFICE
CERTIFICATE OF CORRECTION

PATENT NO.: 5,395,486

DATED: March 7, 1995

INVENTOR(S): Michael E. Killian and John C. Stone

It is certified that error appears in the above-identified patent and that said Letters Patent is hereby corrected as shown below:

Col. 11, line 27, after "glycol." insert new paragraph heading --Example 9--.

Col. 11, line 40, after "flask." insert new paragraph heading --Example 10--.

Col. 13, line 2, after "in" delete "aid" and insert --said--.

Signed and Sealed this

Nineteenth Day of November, 1996

Attest:

BRUCE LEHMAN

*Attesting Officer*    *Commissioner of Patents and Trademarks*